United States Patent [19]

Hayakawa et al.

[11] Patent Number: 5,002,907

[45] Date of Patent: Mar. 26, 1991

[54] HOMOGENOUS SILICON NITRIDE SINTERED BODY

[75] Inventors: Issei Hayakawa, Nagoya; Shigenori Ito, Kasugai, both of Japan

[73] Assignee: NGK Insulators, Ltd., Nagoya, Japan

[21] Appl. No.: 462,944

[22] Filed: Jan. 4, 1990

Related U.S. Application Data

[63] Continuation of Ser. No. 270,966, Nov. 14, 1988, abandoned.

[30] Foreign Application Priority Data

Nov. 26, 1987 [JP] Japan ............................ 62-298460
Feb. 26, 1988 [JP] Japan ............................ 63-44001

[51] Int. Cl.$^5$ ............................................. C04B 35/58
[52] U.S. Cl. ................................... 501/97; 501/98
[58] Field of Search ................................. 501/97, 98

[56] References Cited

U.S. PATENT DOCUMENTS

| | | | |
|---|---|---|---|
| 4,628,039 | 12/1986 | Mizutani et al. | 501/97 |
| 4,699,890 | 10/1987 | Matsui | 501/97 X |
| 4,746,636 | 5/1988 | Yokohama | 501/97 |
| 4,801,565 | 1/1989 | Matsui | 501/97 X |
| 4,818,733 | 4/1989 | Shirai et al. | 501/97 |
| 4,830,991 | 5/1989 | Matsui | 501/97 |

FOREIGN PATENT DOCUMENTS

| | | | |
|---|---|---|---|
| 2258762 | 11/1973 | Fed. Rep. of Germany . | |
| 55-104975 | 8/1980 | Japan | 501/97 |
| 0123870 | 8/1982 | Japan | 501/97 |
| 58-50944 | 11/1983 | Japan . | |
| 0161377 | 8/1985 | Japan | 501/97 |
| 0239363 | 11/1985 | Japan | 501/97 |
| 1097158 | 5/1986 | Japan | 501/97 |
| 101519 | 5/1988 | Japan . | |
| 2063302 | 6/1981 | United Kingdom | 501/97 |

*Primary Examiner*—Karl Group
*Attorney, Agent, or Firm*—Parkhurst, Wendel & Rossi

[57] ABSTRACT

A homogeneous $Si_3N_4$ sintered body is produced having a proportion of a grain boundary crystalline phase to the whole grain boundary of 50% or less, maximum pore diameter of 10 $\mu$m or less and a porosity of 0.5% or less. A process for manufacturing each an $Si_3N_4$ sintered body is, in conventional processes wherein a starting material for $Si_3N_4$ is mixed with a sintering aid, pulverized, granulated, then molded and subsequently fired, characterized in that a temperature lowering rate from a firing temperature to 1,000° C. is made to be 30° C./min. Another process of the invention is, in the above conventional process, characterized in that $Si_3N_4$ containing at least 90% of $\alpha$-$Si_3N_4$ as a starting material and a sintering aid, both having an average grain diameter of 1 $\mu$m or less, are used, the granulated powder is once forcedly dried and then, if required, water is added, before the molding and firing.

3 Claims, No Drawings

HOMOGENOUS SILICON NITRIDE SINTERED BODY

This is a continuation of application Ser. No. 07/270,966 filed Nov. 14, 1988, now abandoned.

BACKGROUND OF THE INVENTION

1. Field of the Invention

The present invention relates to homogeneous silicon nitride sintered bodies which are useful for bearing members, wear resistant members, frictionally moving members, etc., and manufacturing processes thereof.

2. Description of Prior Art

Heretofore, silicon nitride sintered bodies have been manufactured by processes as follows:

On the outset, a silicon nitride starting material is mixed with a sintering aid and after pulverization passed through usually a 44 μm meshed sieve to remove foreign matter, such as fragments of pebbles used during the pulverization, or the like. Then, the sieved starting material mixture is granulated and aged or added with water to control its water content. After further sieving, the mixture is molded by means of mold press or cold isostatic press and then fired at a predetermined temperature to provide sintered bodies.

However, in such conventional processes as mentioned above for manufacturing silicon nitride sintered bodies, neither removal of coarse grains remaining after the pulverization and foreign matter contained in the starting material nor uniformizing of water content in the granulated powder has been positively conducted, so that the following problems that require solution have been involved. Namely, in the conventional processes, there have been cases where the coarse grains and the foreign matter contained in the starting material are incorporated into molded bodies or the water content of the granulated powder is varied. In consequence, the incorporation of the coarse grains and the foreign matter contained in the starting material or the water content variation has caused uneven grain disintegration, resulting in drawbacks, such as the formation of pores which remain in the molded bodies after sintering, or growth of a crystalline phase occupying more than a certain proportion in grain boundary, whereby homogeneous silicon nitride sintered bodies have not been obtainable.

In the case of application particularly to bearing members, wear resistant members or frictionally moving members, the proportion of the crystalline phase in the grain boundary largely affects those members' lives, so that it has been required to manufacture sintered bodies that have a crystalline phase not exceeding a certain proportion in the grain boundary in order to provide the resulting sintered bodies with a life longer than conventional ones. In the case of use for, inter alia, bearing members, it has been known to be important to grasp a rolling fatigue life of its material. Accordingly, development of a material that is homogeneous and of high tenacity has been required for improving the rolling fatigue life.

SUMMARY OF THE INVENTION

Therefore, the object of the present invention is, by obviating the above prior art drawbacks, to provide silicon nitride sintered bodies which are homogeneous and of high tenacity, and a process for manufacturing the same.

The above object can be achieved by the inventions; a homogeneous silicon nitride sintered body characterized by a voluminal proportion of a grain boundary crystalline phase to the whole grain boundary of 50% or less, a maximum pore diameter of 10 μm or less and a porosity of 0.5% or less (the first invention); in processes for manufacturing a silicon nitride sintered body wherein a starting material of silicon nitride and a sintering aid are mixed, pulverized, granulated, then molded and subsequently fired, a process for manufacturing a homogeneous silicon nitride sintered body, which is characterized in that a temperature lowering rate from firing temperature to 1,000° C. is 30° C./min. or more (the second invention); and in processes for manufacturing a silicon nitride sintered body wherein a starting material of silicon nitride and a sintering aid are mixed, pulverized, granulated, then molded and subsequently fired, a process for manufacturing a homogeneous silicon nitride sintered body, which is characterized in that silicon nitride containing 90% or more of α-silicon nitride and having an average grain diameter of 1 μm or less and a sintering aid having an average grain diameter of 1 μm or less are used as said starting material and sintering aid, the granulated powder is once forcedly dried and then, if required, water is added, before the molding (the third invention).

DETAILED DESCRIPTION OF THE INVENTION

In the present invention, the maximum pore diameter and the porosity were determined by optical microscopic observation at 400× magnification of a specular polished surface of the sintered body. The maximum pore diameter is the diameter which upon measurement is found to be the largest of 1,000 pores. Alternatively, a whole pore area was obtained by summing up all areas of 1,000 pores actually measured, and the porosity was found by dividing the whole pore area by a whole area of field of view required for the measurement.

Further, the proportion (A) of grain boundary crystalline phase to the whole boundary phase in a sintered body was found by the following equations:

$$A = \frac{\text{Volume ratio of grain boundary crystalline phase } (V_2)}{\text{Volume ratio of the whole grain boundary phase } (V_1)} \times 100(\%)$$

wherein, $V_1$: an area ratio (%) of the grain boundary phase obtained from a photomicrograph of a fine structure shown on an etched specular polished surface of the sintered body, wherein the grain boundary phase is distinguishable from $Si_3N_4$, (since an area ratio at a cross-section of the sintered body can be accounted to be approximately equal to a volume ratio, the area ratio is herein used to define the volume ratio) and $$V_2 = \frac{\text{Peak maximum height of grain boundary crystalline phase}^*}{(\text{Peak height of } I_{\beta(110)} \times 5)} \times$$

$\beta\text{-ratio} \times (100\ V_1)/100$

-continued

Note:
*when the peak maximum height of the grain boundary is not identifiable due to overlapping with the peak of $Si_3N_4$, a value obtained from the peak height of $I/I_1$ = $K$ ($K$ is as close to 100 as possible) multiplied by $100/K$ is used.

Alternatively, the proportion (B) of the grain boundary crystalline phase to the silicon nitride crystalline phase is calculated according to the following equation:

$$B = \frac{\text{Peak maximum height of grain boundary crystalline phase}}{(\text{Peak height of } I_{\beta(100)} \times 5)} \times \beta\text{-ratio}$$

$$\beta\text{-ratio} = \frac{(I_{\beta(101)} + I_{\beta(210)}) \times 100}{I_{\alpha(102)} + I_{\alpha(210)} + I_{\beta(101)} + I_{\beta(210)}}$$

wherein,
$I_{\alpha}(102)$: peak height of $\alpha\text{-}Si_3N_4$ (102),
$I_{\alpha}(210)$: peak height of $\alpha\text{-}Si_3N_4$ (210),
$I_{\beta}(101)$: peak height of $\beta\text{-}Si_3N_4$ (101), and
$I_{\beta}(210)$: peak height of $\beta\text{-}Si_3N_4$ (210).

In the homogeneous silicon nitride sintered body according to the present invention, the voluminal proportion of the grain boundary crystalline phase to the whole grain boundary is 50% or less, preferably 30% or less, more preferably 10% or less. If the proportion of the grain boundary crystalline phase exceeds 50%, the sintered body will have an inhomogeneous fine structure, resulting in deterioration of wear resistance, rolling fatigue life, etc.

Additionally, this grain boundary crystalline phase is preferred to be in an amount of 5% or less, more preferably 2% or less, of the silicon nitride crystalline phase.

Further, the sintered body according to the present invention has a maximum pore diameter of 10 μm or less, preferably 6 μm or less, more preferably 4 μm or less. Additionally, the sintered body according to the present invention has a porosity of 0.5% or less, preferably 0.3% or less, more preferably 0.1% or less. When the maximum pore diameter of the sintered body exceeds 10 μm and the porosity exceeds 0.5% mechanical characteristics, such as tenacity, hardness or the like, will be deteriorated, whereby the wear resistance, rolling fatigue life, etc. will also be deteriorated.

Furthermore, the silicon nitride sintered body according to the present invention contains as a sintering aid at least one oxide selected from the group consisting of rare earth element oxides, $ZrO_2$, alkaline earth metal oxides and $Al_2O_3$, preferably $Y_2O_3$, $ZrO_2$ and MgO. These sintering aids are contained in an amount per one kind of preferably 0.1~10%, more preferably 0.5~5%, and in the aggregate (total amount of all sintering aids), preferably 0.5~20%, more preferably 1~15%, by weight.

The term "one kind" in the foregoing is to be understood to mean one kind selected from the four kinds of oxides: rare earth element oxides, $ZrO_2$, alkaline earth metal oxides and $Al_2O_3$. In the case of rare earth element oxides or alkaline earth metal oxides, the one kind may include a plurality of compounds that are however preferred to aggregate to 0.1~10% by weight within the one kind.

Additionally, when the aggregate amount is in the range of 1~5% by weight, resistance to corrosion from acids and/or alkalis is improved, so that it is preferred in the case where an anticorrosive property is required.

Besides, in the case where the oxides turn into nitrides through a reaction during sintering, the above contents are values converted to oxides.

When the content of sintering aid is lower than the above-mentioned range, the effect of densification of the silicon nitride is too low, while, when the aggregate exceeds 20% by weight, the proportion of grain boundary phase increases so much that inherent characteristics of the silicon nitride tend to be impaired.

As the above-mentioned rare earth element oxides, there are used, for example, $La_2O_3$, $CeO_2$, $Y_2O_3$ and $Yb_2O_7$. As the alkaline earth metal oxides, there are used, for example, MgO and SrO.

Homogeneous silicone nitride sintered bodies having a composition and characteristics as mentioned above can be manufactured by a process comprising the steps of: preferably once forced drying of granulated material powder; adding water if required; molding; subsequent firing; and then cooling from the firing temperature to 1,000° C. at a temperature lowering rate of at least 30° C./min. (hereinafter, this process is conveniently referred to as a first manufacturing process). Namely, in this first manufacturing process, the most significant feature is to maintain the temperature lowering rate after firing, on or above a predetermined level.

The temperature lowering rate after firing is at least 30° C./min., preferably at least 50° C./min., more preferably at least 80° C./min.

When the temperature lowering rate is lower than 30° C./min., the grain boundary crystalline phase is apt to separate during the cooling, resulting in an inhomogeneous fine structure.

Additionally, when the firing step consists of a preliminary firing stage under normal pressure and a subsequent firing stage under a hot isostatic pressure, a cooling operation conducted with a temperature lowering rate of at least 30° C./min in either one of the preliminary and subsequent firing stages, will substantially prevent the grain boundary crystalline phase separation, yielding sintered bodies having a homogeneous fine structure. Alternatively, if the cooling operation with a temperature lowering rate of at least 30° C./min. is conducted in both the preliminary and subsequent firing stages, more prefereable results are obtainable as compared with the case where such a cooling is conducted in only one firing stage.

Further, it is preferred to optionally add water to the forced dried granular powder, to eliminate difference in water content between granules, whereby uniform granules are obtainable.

As described above, in the process of the present invention, the firing step follows the molding step. In the firing step there are two modes: the firing conducted under normal pressure; and the two stage firing treatment consisting of a preliminary firing stage under normal pressure and a subsequent firing stage under a hot isostatic pressure. In this two stage firing treatment, the preliminary firing stage may be either a preliminary firing or encapsulation into capsules (treatment-in-capsule process) of the molded bodies. In the preliminary firing stage, the molded bodies are primarily fired at 1,400°~1,600° C., preferably under nitrogen atmosphere of normal pressure. If the firing temperature is lower than 1,400° C., open pores will not disappear even after the firing, so that dense sintered bodies can not be obtained even after the hot isostatic press treatment. Alternatively, if the firing temperature is higher than 1,600° C., a decomposition reaction of silicon nitride will progress, so that homogeneous sintered bodies that are high in density and tenacity will not be obtained even after the hot isostatic press treatment.

Meanwhile, in the treatment-in-capsule process, the molded bodies are encapsulated after vacuum extraction in glass capsules that preferably comprise $SiO_2$ as a main component, or embedded in glass powder which is molten by heating during firing, to encapsulate the molded bodies. As a capsule, glass is preferred because of its excellent deformability and tight-sealability during hot isostatic pressing.

When the treatment-in-capsule process is carried out, the encapsulation into capsules of molded bodies and hot isostatic pressing are successively conducted usually in the same sintering furnace.

After these preliminary firing treatments have been effected, a hot isostatic press treatment is conducted at 1,500°~1,900° C. under a nitrogen atmosphere of preferably 200~1,700 atm.

Further, in the present invention, homogeneous silicon nitride sintered bodies having characteristics as mentioned above can be manufactured also by using, as starting materials, silicon nitride containing 90% or more of α-silicon nitride (α-$Si_3N_4$) having an average grain diameter of 1 μm or less and a sintering aid having an average grain diameter of 1 μm or less, once forcedly drying granulated starting material powder, then, if required, adding water, and molding followed by firing (hereinafter, this process is conveniently referred to as a second manufacturing process).

In the second manufacturing process, the silicon nitride starting material and sintering aids to be used have an average grain diameter of 1 μm or less, preferably 0.8 μm or less, more preferably 0.6 μm or less. When the average grain diameter exceeds 1 μm, uneven reaction of the silicon nitride and sintering aids is brought about and the grain boundary crystalline phase is apt to separate during the cooling, resulting in an inhomogeneous fine structure.

Additionally, it is known that two kinds of crystal structures, i.e., α-phase and β-phase, are present in the silicon nitride. In this instance, it is preferred to use a silicon nitride starting material containing 90% or more of α-silicon nitride for obtaining an $Si_3N_4$ sintered body that is high in tenacity, density and hardness.

Further, in the case of the second manufacturing process, the firing is performed, as described above, under normal pressure or in the preliminary firing stage under normal pressure and the subsequent hot isostatic press. This hot isostatic press is conducted at 1,500°~1,900° C., preferably under nitrogen atmosphere of 200~1,500 atm.

In the first and second manufacturing processes, as a sintering aid to be mixed with the silicon nitride starting material, at least one oxide selected from the group consisting of rare earth element oxides, $ZrO_2$, alkaline earth metal oxides, $Al_2O_3$, is used in an amount per one kind of 0.1~10%, preferably 0.5~5%, and in the aggregate 0.5~20%, preferably 1~15%, by weight. Additionally, the above-said "one kind" also means, as the foregoing, one kind selected from the four kinds of oxides: rare earth element oxides, $ZrO_2$, alkaline earth metal oxides and $Al_2O_3$. In the case of rare earth element oxides or alkaline earth metal oxides, the one kind may include a plurality of compounds that are, however, preferred to aggregate to 0.1~10% by weight within the one kind.

Besides, in the case where a salt that turns into an oxide by heating is used, the above contents are values converted to the oxide.

The above sintering aids are preferred to be used as a combination of $Y_2O_3$ and $ZrO_2$ with an alkaline earth metal oxide, preferably MgO.

The $ZrO_2$ may be added by way of wearing-out of $ZrO_2$ pebbles, or in the form of $ZrO_2$ powder or a Zr-salt to produce $ZrO_2$ upon heating. The addition in the form of $ZrO_2$ powder or a Zr-salt to produce $ZrO_2$ upon heating is preferred to that by way of wearing-out of $ZrO_2$ pebbles, for more uniform dispersion of $ZrO_2$ can be attained to yield a homogeneous structure.

In the above sintering aids, $La_2O_3$, $CeO_2$ and $Y_2O_3$ as a rare earth element oxide and MgO and SrO as an alkaline earth metal oxide are preferably employed.

According to the first or second manufacturing process as described above, homogeneous silicon nitride sintered bodies having characteristics as explained above can be manufactured.

Now, preferred embodiments of the above explained present invention are summarized as follows:

(a) The homogeneous silicon nitride sintered body according to the present invention, wherein the voluminal proportion of the grain boundary crystalline phase is 30% or less.

(b) The homogeneous silicon nitride sintered body according to the present invention, which contains 0.1~10% per one kind and, in the aggregate, 0.5~20%, by weight, of at least one oxide selected from the group consisting of four kinds of oxides: rare earth element oxides, $ZrO_2$, alkaline earth metal oxides and $Al_2O_3$.

(c) The homogeneous silicon nitride sintered body according to the present invention, which contains $Y_2O_3$, $ZrO_2$ and MgO.

(d) The process for manufacturing a homogeneous silicon nitride sintered body according to the present invention, which process comprises the steps of: once forcedly drying granulated powder, then adding water if required, molding and then firing.

(e) The process for manufacturing a homogeneous silicon nitride sintered body according to the present invention, wherein the firing step is conducted at normal pressure.

(f) The process for manufacturing a homogeneous silicon nitride sintered body according to the present invention, wherein the firing step consists of a preliminary firing stage under normal pressure and a subsequent firing stage under hot isostatic pressure, and the cooling is conducted at a temperature lowering rate of at least 30° C./min. in at least one of said preliminary and subsequent firing stages.

(g) The process for manufacturing a homogeneous silicon nitride sintered body according to the present invention, wherein the temperature lowering rate in the preliminary and subsequent firing stages is at least 50° C./min.

(h) The process for manufacturing a homogeneous silicon nitride sintered body according to the present invention, wherein at least one oxide selected from the group consisting of four kinds of oxides: rare earth element oxides, $ZrO_2$, alkaline earth metal oxides and $Al_2O_3$ is used as a sintering aid in an amount of 0.1~10% per one kind and, in the aggregate, 0.5~20%, by weight.

(i) The process for manufacturing a homogeneous silicon nitride sintered body according to the present invention, wherein the $ZrO_2$ is added by way of wearing-out of $ZrO_2$ pebbles or in the form of $ZrO_2$ powder.

(j) The process for manufacturing a homogeneous silicon nitride sintered body according to the present invention, wherein $Y_2O_3$, $ZrO_2$ and MgO are used as a sintering aid.

(k) The process for manufacturing a homogeneous silicon nitride sintered body according to the present invention, wherein firing is conducted under hot isostatic pressure.

The present invention will be explained hereinafter in more detail by way of example which should not be construed as limitative but illustrative.

an alumina container with an inside diameter of 120 mm was used and rotation was effected at 150 rpm. Further, as a slurry, #100 silicon carbide powder and water were blended with a weight ratio of 1:1 and half of the container was filled with the slurry. The above fabricated 5 columnar sintered bodies of 15 mm (dia.)×15 mm (length) were put into this container and the hard wearing test was carried out for 24 hours. A worn-out amount was found from weight and size differences before and after the test.

As seen in Table 1, it was demonstrated that when the temperature lowering rate at the firing step is less than 30° C./min., the proportion of the grain boundary crystalline phase to the whole grain boundary phase exceeds 50% and the worn-out amount appreciably increases.

TABLE 1

|  | Firing temperature (°C.) | Temperature lowering rate (°C./min.) | Characteristics of sintered body ||||| 
|---|---|---|---|---|---|---|---|
|  |  |  | Proportion of grain boundary crystalline phase to whole grain boundary (%) | Proportion of grain boundary crystalline phase to $Si_3N_4$ crystalline phase (%) | Maximum pore diameter (μm) | Porosity (%) | Worn-out amount (mg/cm$^2$) |
| Example 1 | 1700 | 30 | 47 | 7 | 8 | 0.4 | 0.20 |
| 2 | 1700 | 50 | 27 | 4 | 8 | 0.3 | 0.09 |
| 3 | 1700 | 100 | 7 | 1 | 7 | 0.3 | 0.02 |
| 4 | 1750 | 80 | 13 | 2 | 6 | 0.2 | 0.04 |
| Comparative Example 1 | 1700 | 20 | 67 | 10 | 8 | 0.5 | 1.0 |
| 2 | 1750 | 10 | 87 | 13 | 7 | 0.4 | 5.0 |

EXAMPLES 1~4, COMPARATIVE EXAMPLES 1 AND 2

To 100 parts by weight of α-silicon nitride powder having an average grain diameter of 0.4 μm, 5 weight % $Y_2O_3$, 3 weight % $Al_2O_3$ and 100 parts by weight of water were added. The mixture was pulverized and mixed for 5 hours in an oscillation mill using $ZrO_2$ pebbles of 5 mm diameter. Two weight % $ZrO_2$ was admixed by way of wearing-out the pebbles. Then, after passing the mixed and pulverized slurry through a 32 μm mesh JIS standard sieve, 2 weight % polyvinyl alcohol (PVA) and 0.5 weight % stearic acid were admixed as an auxiliary agent for spray drying. By conducting spray drying, granular powder having an average grain diameter of 80 μm and a water content of 1% by weight was obtained. Further, after drying at 80° C. for 24 hours using an isothermal dryer and then passing through a 149 μm meshed JIS standard sieve, the granular powder was molded with a cold isostatic press under a pressure of 2.5 tons/cm$^2$ and a molded body of 30 mm (dia.)×100 mm (length) was obtained. Then, the molded body was degreased at a temperature of 500° C. for 2 hours. After maintaining the degreased molded body at 1,700°~1,750° C. for 1 hour in a nitrogen gas atmosphere, the temperature was lowered at temperature lowering rates respectively shown in Table 1 below, to provide a sintered body. With respect to the obtained sintered body, proportions of the grain boundary crystalline phase to the silicon nitride crystalline phase and to the whole grain phase, respectively, the maximum pore diameter and the porosity were determined in accordance with the aforementioned methods. The determined values are shown in Table 1. Columns of 15 mm (dia.)×15 mm (length) were cut out from the sintered body. After polishing with a #140 diamond grindstone, the columns were tested for hard wearing property using a ball mill under testing conditions that

EXAMPLES 5~10, COMPARATIVE EXAMPLES 3~5

To 100 parts by weight of α-silicon nitride powder having an average grain diameter of 0.5 μm, 8 weight % $Y_2O_3$, 4 weight % MgO and 100 parts by weight of water were added. The mixture was pulverized and mixed for 3 hours in an attritor using $ZrO_2$ pebbles having 5 mm diameter. One weight % $ZrO_2$ was admixed by way of wearing-out the pebbles. After passing the mixed and pulverized slurry through a 20 μm mesh sieve, 2 weight % PVA was added, and then by using a spray dryer, granular powder was prepared. Further, after conducting forced drying at temperatures respectively shown in Table 2 below for 24 hours using an isothermal dryer and adding 3 weight % water, the granular powder was passed through a 325 μm mesh sieve. The obtained granular powder was molded with a cold isostatic press under a pressure of 5 tons/cm$^2$ and a molded body of 65 mm (dia.)×50 mm (length) was fabricated. Then, the molded body was degreased at a temperature of 500° C. for 3 hours. After conducting a preliminary firing at 1,500° C. for 5 hours, the temperature was lowered at temperature lowering rates respectively shown in Table 2 and then hot isostatic press (HIP) under a pressure of 1,000 atm. at 1,700° C. for 1 hour followed by subsequent cooling at temperature lowering rates respectively shown in Table 2.

The obtained sintered body was measured for proportions of grain boundary crystalline phase, maximum pore diameter and porosity, as Example 1.

Further, discs of 50 mm (dia.)×10 mm (thickness) were cut out from the sintered body. After specular polishing, a rolling fatigue test was conducted at a Herts stress of 600 kg/mm$^2$ with a 6 ball type thrust bearing tester. These results are shown in Table 2 as well. As is seen in Table 2, in the case where the temperature lowering rate is 30° C./min. or more in the preliminary firing stage or HIP firing stage, the proportion of the grain boundary crystalline phase to the whole grain boundary phase becomes less than 50% and, longer rolling fatigue lives are obtained as compared with the case where the temperature lowering rates in the both stages are less than 30° C./min.

C./min. followed by natural cooling to room temperature. The obtained sintered body was measured for proportion of grain boundary crystalline phase, maximum pore diameter and porosity, as Example 2. The result is shown in Table 3 below. It has been demonstrated that, whenever sintering aids having an average grain diameter of 1 μm or less are used, a long rolling fatigue life is obtained.

TABLE 2

| | Forced drying temperature (°C.) | Temperature lowering rate from 1550° C. to 1000° C. (°C./min) | Temperature lowering rate from 1700° C. to 1000° C. (°C./min) | Characteristics of sintered body | | | | |
|---|---|---|---|---|---|---|---|---|
| | | | | Proportion of grain boundary crystalline phase to whole grain boundary (%) | Proportion of grain boundary crystalline phase to $Si_3N_4$ crystalline phase (%) | Maximum pore diameter (μm) | Porosity (%) | Rolling fatigue life (cycle) |
| Example 5 | 40 | 30 | 10 | 48 | 9 | 5.5 | 0.38 | $0.1 \times 10^7$ |
| 6 | 40 | 80 | 50 | 16 | 3 | 5.0 | 0.22 | $1.0 \times 10^7$ |
| 7 | 40 | 50 | 10 | 27 | 5 | 5.0 | 0.32 | $0.5 \times 10^7$ |
| 8 | 60 | 100 | 100 | 5 | 1 | 4.0 | 0.15 | $6 \times 10^7$ |
| 9 | 80 | 120 | 120 | 0 | 0 | 2.5 | 0.05 | $30 \times 10^7$ |
| 10 | 100 | 50 | 80 | 11 | 2 | 4.0 | 0.10 | $2 \times 10^7$ |
| Comparative Example 3 | — | 20 | 20 | 58 | 11 | 14.0 | 0.40 | $0.03 \times 10^7$ |
| 4 | — | 10 | 5 | 68 | 13 | 14.5 | 0.45 | $0.02 \times 10^7$ |
| 5 | — | 5 | 5 | 80 | 15 | 15.0 | 0.45 | $0.01 \times 10^7$ |

EXAMPLES 11~14, COMPARATIVE

TABLE 3

| | $Y_2O_3$, average grain diameter (μm) | SrO average grain diameter (μm) | $ZrO_2$, average grain diameter (μm) | Characteristics of sintered body | | | | |
|---|---|---|---|---|---|---|---|---|
| | | | | Proportion of grain boundary crystalline phase to whole grain boundary (%) | Proportion of grain boundary crystalline phase to $Si_3N_4$ crystalline phase (%) | Maximum pore diameter (μm) | Porosity (%) | Rolling fatigue life (cycle) |
| Example 11 | 1.0 | 0.7 | 0.9 | 46 | 8 | 6.0 | 0.25 | $0.1 \times 10^7$ |
| 12 | 1.0 | 0.7 | 0.5 | 23 | 4 | 5.5 | 0.21 | $1 \times 10^7$ |
| 13 | 0.4 | 0.7 | 0.9 | 40 | 7 | 4.0 | 0.10 | $0.2 \times 10^7$ |
| 14 | 0.4 | 0.7 | 0.5 | 17 | 3 | 4.0 | 0.08 | $3 \times 10^7$ |
| Comparative Example 6 | 2.0 | 0.7 | 0.9 | 63 | 11 | 8.0 | 0.72 | $0.05 \times 10^7$ |
| 7 | 2.0 | 0.7 | 1.5 | 91 | 16 | 8.5 | 1.10 | $0.001 \times 10^7$ |

EXAMPLES 6 AND 7

To 100 parts by weight of silicon nitride powder containing 95% or more of α-silicon nitride and having an average grain diameter of 0.4 μm, 6 weight % of $Y_2O_3$ having an average grain diameter of 1.0 μm or 0.4 μm, 4 weight % SrO having an average grain diameter of 0.7 μm, 1.5 weight % $ZrO_2$ having an average grain diameter of 0.9 μm or 0.5 μm and 100 parts by weight of water were added. The mixture was pulverized and mixed for 1 hour in an attritor. For comparative purposes, a slurry was prepared with the same addition and pulverization conditions as above, except that $Y_2O_3$ having an average grain diameter of 2.0 μm and $ZrO_2$ having an average grain diameter of 1.5 μm were used. These compounded mixtures were treated in the same manner as Example 2, except that a forced drying at 100° C. for 24 hours was conducted. The resulting granular powders were molded with a cold isostatic press under a pressure of 7 tons/cm² and a molded body of 65 mm (dia.)×50 mm (length) was fabricated. Then, the molded body was degreased at a temperature of 500° C. for 3 hours. After conducting a preliminary firing at 1,500° C. for 3 hours, the temperature was lowered to 1,000° C. at a temperature lowering rate of 15° C./min. and then naturally cooled to room temperature. Then, hot isostatic pressing was conducted under a pressure of 1,500 atm. at 1,650° C. for 1 hour and the temperature was lowered with a temperature lowering rate of 15°

EXAMPLES 15 AND 16, COMPARATIVE EXAMPLE 8

To 100 parts by weight of α-silicon nitride powder having an average grain diameter of 0.5 μm, 0.3 weight % SrO, 1.0 weight % MgO, 1.5 weight % $CeO_2$ and 100 parts by weight of water were added. The mixture was pulverized and mixed for 3 hours in an attritor using $Si_3N_4$ pebbles to prepare a slurry (Sample A).

Further, to 100 parts by weight of the same silicon nitride powder as the above, 0.1 weight % SrO, 0.1 weight % MgO, 3.0 weight % $CeO_2$ and 100 parts by weight of water were added. The mixture was pulverized and mixed for 5 hours in an attritor using $ZrO_2$ pebbles of 5 mm diameter. Then, 1.8 weight % $ZrO_2$ was admixed by way of wearing-out the pebbles. Thus, another slurry (Sample B) was prepared.

After passing those slurries through a 25 μm meshed sieve, 2 weight % PVA and 0.2 weight % stearic acid were admixed as an auxiliary agent for spray drying. Then, by conducting spray drying, granular powders were obtained. These granular powders were press molded under a pressure of 1 ton/cm² to produce balls with a diameter of 20 mm. In order to prepare for HIP treatment-in-capsule of these balls, the balls were, on the outset, heated to 500° C. under vacuum to remove binders and then placed with glass powder in sheaths so that the balls are embedded in the glass powder. Two kinds of sheaths: one containing Samples A and B, and the other containing only Sample B, were prepared.

shows a larger worn-out amount and the sample added with sintering aids in as small an amount as 2.8 weight % shows good wearing and corrosive properties.

TABLE 4

| | Kind and addition rate of sintering aids (Wt. %) | Temperature lowering rate from 1600° C. to 1000° C. (°C./min) | Characteristics of sintered body | | | | |
|---|---|---|---|---|---|---|---|
| | | | Proportion of grain boundary crystalline phase to whole grain boundary (%) | Proportion of grain boundary crystalline phase to $Si_3N_4$ crystalline phase (%) | Maximum pore diameter ($\mu m$) | Porosity (%) | Worn-out amount (mg/cm$^2$) |
| Example 15 | SrO:MgO:CeO$_2$ = 0.3:1.0:1.5 | 100 | 10 | 1 | 2.5 | 0.02 | 0.02 |
| 16 | SrO:MgO:CeO$_2$:ZrO$_2$ = 0.1:0.1:3.0:1.8 | 100 | 15 | 1 | 3.0 | 0.05 | 0.1 |
| Comparative Example 8 | SrO:MgO:CeO$_2$:ZrO$_2$ = 0.1:0.1:3.0:1.8 | 10 | 70 | 6 | 3.5 | 0.08 | 1.6 |

When the sheath containing Samples A and B was used, pressurizing and heating as melting the glass, HIPing was conducted for 2 hours under 500 kg/cm$^2$ at 1,600° C. Then, the temperature was lowered to 1,000° C. at a rate of 100° C./min. and subsequently naturally cooled to room temperature.

Alternatively, when the sheath containing Sample B only was used, the same HIPing as the above was conducted for 2 hours at 1,600° C., but the temperature was lowered to 1,000° C. at a rate of 10° C./min., followed by natural cooling to room temperature.

The obtained sintered bodies were measured for the proportion of grain boundary crystalline phase, maximum pore diameter and porosity. The result is shown in Table 4 below.

Additionally, Sample B cooled at a rate of 100° C./min. was apparently homogeneous, while, on Sample B cooled at a rate of 10° C./min., spotted patterns were observed. It turned out as a result of a fine focus X-ray diffraction analysis that the stained portion had been largely crystallized as compared with unstained portions. Additionally, proportions of the grain boundary crystalline phase shown in Table 4 represent mean values in the whole sample.

With respect to the obtained balls, a hard wearing and corrosive test was conducted with a ball mill in the same manner as the hard wearing test in Example 2, except that 15% HCl was used instead of the water. The worn-out amount was found from weight at size differences before and after the test. As seen in Table 4, the sample cooled at a lower temperature lowering rate As explained and demonstrated above, in accordance with the present invention, homogeneous silicon nitride sintered bodies having small maximum pore diameter and porosity and excellent characteristics, such as wear resistance, rolling fatigue life or the like, can be obtained. Accordingly, the silicon nitride sintered bodies of the present invention can be very effectively employed for wear resistant members, frictionally moving members, etc. as well as bearing members.

What is claimed is:

1. A homogeneous silicon nitride sintered body having a porosity of 0.5% or less, the sintered body comprising:

0.5~20 wt % of at least one oxide selected from the group consisting of: 0.1~10 wt % rare earth element oxides, 0.1~10 wt % $ZrO_2$, 0.1118 10 wt % alkaline earth metal oxides and 0.1~10 wt % $Al_2O_3$, the remainder being silicon nitride;

a silicon nitride crystalline phase; and a grain boundary crystalline phase in a voluminal proportion of 50% or less to an entire grain boundary phase and 5% or less to the silicon nitride crystalline phase.

2. The silicon nitride body of claim 1, wherein the silicon nitride body has a maximum pore diameter of 10 $\mu m$ or less.

3. The silicon nitride body of claim 1, wherein the silicon nitride body has a rolling fatigue life of at least $0.1 \times 10^7$ cycles at a Hertz stress of 60 kg/mm$^2$.

* * * * *

UNITED STATES PATENT AND TRADEMARK OFFICE
CERTIFICATE OF CORRECTION

PATENT NO. : 5,002,907

DATED : March 26, 1991

INVENTOR(S) : Issei HAYAKAWA and Shigenori ITO

It is certified that error appears in the above-identified patent and that said Letters Patent is hereby corrected as shown below:

Column 12, claim 1, line 6, change "0.1118 10" to --0.1~10--.

Signed and Sealed this

Twenty-second Day of September, 1992

Attest:

DOUGLAS B. COMER

*Attesting Officer*     *Acting Commissioner of Patents and Trademarks*